United States Patent
Leenhouts et al.

(10) Patent No.: US 6,424,403 B1
(45) Date of Patent: Jul. 23, 2002

(54) TOUCH SENSOR DISPLAY

(75) Inventors: Frans Leenhouts, Eindhoven (NL); Glenn J. Adler, Redwood City, CA (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/288,398

(22) Filed: Apr. 8, 1999

(30) Foreign Application Priority Data

Apr. 9, 1998 (EP) .............................................. 98201141

(51) Int. Cl.[7] .............................................. G02F 1/1335
(52) U.S. Cl. .............................................. 349/199; 349/12
(58) Field of Search .............................. 349/199, 201, 349/176, 12, 96; 250/205, 225, 574

(56) References Cited

U.S. PATENT DOCUMENTS

| | | | | |
|---|---|---|---|---|
| 4,723,836 A | * | 2/1988 | Kono ........................ 350/331 |
| 5,194,862 A | | 3/1993 | Edwards ...................... 341/20 |
| 5,278,545 A | | 1/1994 | Streck ........................ 345/102 |
| 5,724,109 A | * | 3/1998 | Nakamura et al. ............ 349/79 |
| 5,771,039 A | * | 6/1998 | Ditzik ........................ 345/178 |
| 5,772,250 A | * | 6/1998 | Gasper ....................... 283/114 |
| 5,966,108 A | * | 10/1999 | Ditzik ........................ 345/74 |
| 6,163,313 A | * | 12/2000 | Aroyan et al. .............. 345/173 |

FOREIGN PATENT DOCUMENTS

EP 495199 1/1991 ........... G06F/3/033

* cited by examiner

*Primary Examiner*—William L. Sikes
*Assistant Examiner*—Hoan Nguyen
(74) *Attorney, Agent, or Firm*—Aaron Waxler

(57) ABSTRACT

Manufacture of a display device for a touch panel display, for example, an LCD (20) is simplified by attaching parts of the display panel, for example, a light-scattering film (27) and a polarizer (28) to a substrate (11) of the touch panel (10).

5 Claims, 1 Drawing Sheet

TOUCH SENSOR DISPLAY

BACKGROUND OF THE INVENTION

The invention relates to a device comprising a sensor device with a detection device for determining information of at least a part of a surface of the sensor device, a display device comprising an electro-optical medium between two substrates, and a driver for driving the display device in dependence upon the information obtained via the detection device.

The invention also relates to a sensor device for use in such devices.

Devices of this type (also referred to as touch panels) are generally known; in which different sensor mechanisms can be used. For determining information, it is possible to activate a part of the surface by scanning and measuring, for example activating via light (by means of, for example, a light pen) and by subsequently measuring induced currents or capacitively measuring electric voltages induced by pressure variation. The displayed information may vary from the co-ordinates of the part of the surface to the luminescence of the relevant part or possibly a menu activated thereby in computer applications.

A device of this type is described in U.S. Pat. No. 5,194,862. For the sensor device (realized on a panel) described in this patent, it is indicated how it can be used as an overlay for a liquid crystal display device (LCD).

When this type of device is used, notably in portable applications (mini-notebook computers, personal digital assistance devices, telecommunication), it is desirable that a minimal quantity of energy is used. Use is therefore preferably made of reflective display devices (LCDs) which make use of a reflector or reflective electrodes. To give such display devices a satisfactory reflecting power, they are provided with a light-scattering film on the surface where a polarizer is usually situated. The total stack of the light-scattering layer, the polarizer and often a retardation film is usually provided as a whole on the surface of one of the substrates. The manufacture of this stack on large surfaces with constant thicknesses of the sub-layers is very difficult from a manufacturing-technical point of view. Moreover, the fixation of the complete stack on the substrate involves many problems.

SUMMARY OF THE INVENTION

The sensor device comprises a substrate which is provided with a light-scattering film or a polarizer on its side facing the electro-optical medium.

The fixation of (a part of) the stack on the substrate of the sensor device (light-scattering film on glass) is technologically simpler than the fixation of the complete stack on the usually much thinner substrate of the display device (polarizer on glass or retardation film).

A polarizer may be advantageously provided on the substrate, together with the light-scattering film.

A preferred embodiment of a device according to the invention is characterized in that said substrate of the sensor device is further provided with an anti-reflex coating.

A further embodiment is characterized in that a substrate of the display device remote from the sensor device is provided with a reflector.

The reflector may be arranged on the inner side or the outer side of the substrate of the display device. The reflector is preferably arranged on the side, facing the electro-optical medium, of the substrate of the display device remote from the sensor device.

In a further embodiment, the substrate of the display device remote from the sensor device comprises a silicon substrate in which, for example drive switches are realized (active drive) or which incorporates further drive functions.

These and other aspects of the invention are apparent from and will be elucidated with reference to the embodiments described hereinafter.

BRIEF DESCRIPTION OF THE DRAWINGS

FIG. 1 cross-section of a known device, while

The Figures are diagrammatic and not drawn to scale. Corresponding components are generally denoted by the same reference numerals.

Figure 3:
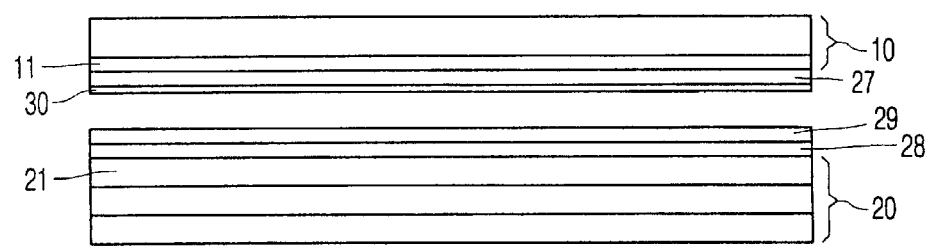
FIGS. 3 and 4 show devices according to the invention.
Figure 4:
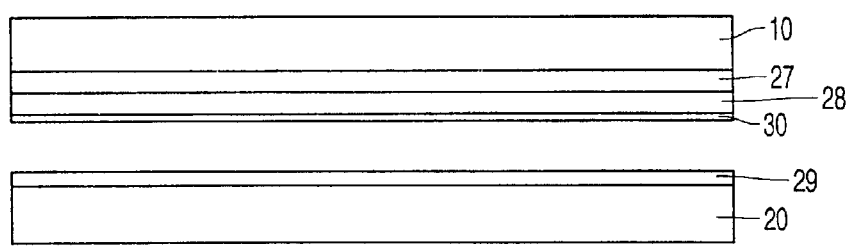

The device of FIG. 3 can be manufactured much more easily. On the one hand, the light-scattering layer 27 can be more easily provided on the substrate 11 of the sensor device 10 than on the stack of the polarizer 28 and the retardation film 29. On the other hand, the omission of the light-scattering layer 27 enhances the flexibility of the stack 28, 29 so that it can be more easily provided on the substrate 21. In the embodiment shown in FIG. 3, the light-scattering layer 27 is provided with an anti-reflex coating 30 which prevents specular reflections on the rear side of the sensor device 10. Said advantages also apply to the embodiment shown in FIG. 4 in which a stack of the light-scattering layer 27 and the polarizer 28 is provided on the rear side of the sensor device 10, as well as an anti-reflex coating 30, and for stacks in which the light-scattering layer 27 and the polarizer 28 have exchanged positions.

Although reflecting electrodes 25 have been shown, they may be alternatively transmissive when a reflector is situated on the other side of the substrate 22. Instead of an LCD display device, other reflective display devices may be used alternatively.

Transmissive and transflective display devices may also be used.

A silicon substrate 22 in which, for example drive electronics is realized by means of IC technology, may also be used.

In the embodiments, the main faces of the substrates 11 and 21 are substantially parallel to each other. By placing them at an angle α with respect to each other, in which 0<α<15 degrees and preferably α<5 degrees, it is prevented that loss of contrast and color purity occurs due to reflections on the substrate 12, the coating 16 or other reflective surfaces.

DETAILED DESCRIPTION OF THE PREFERRED EMBODIMENTS

Figure 1:
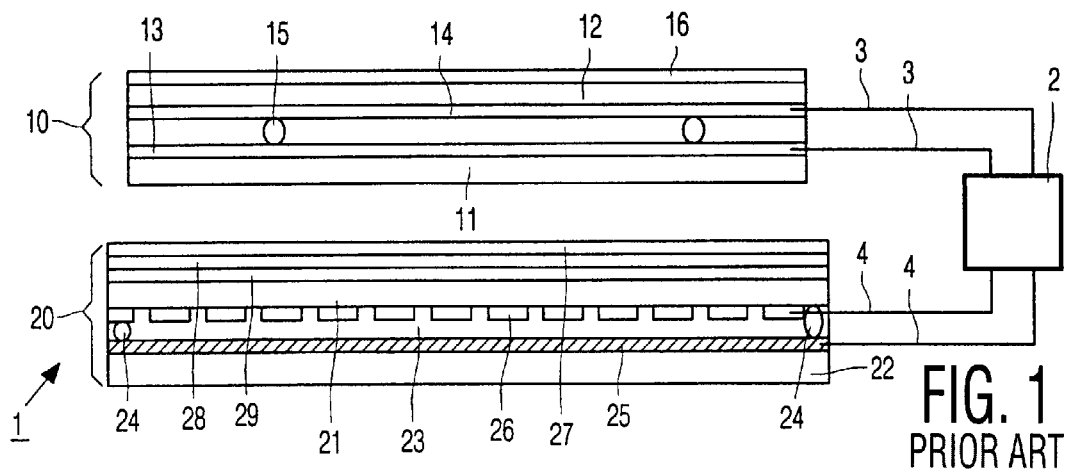
Figure 2:
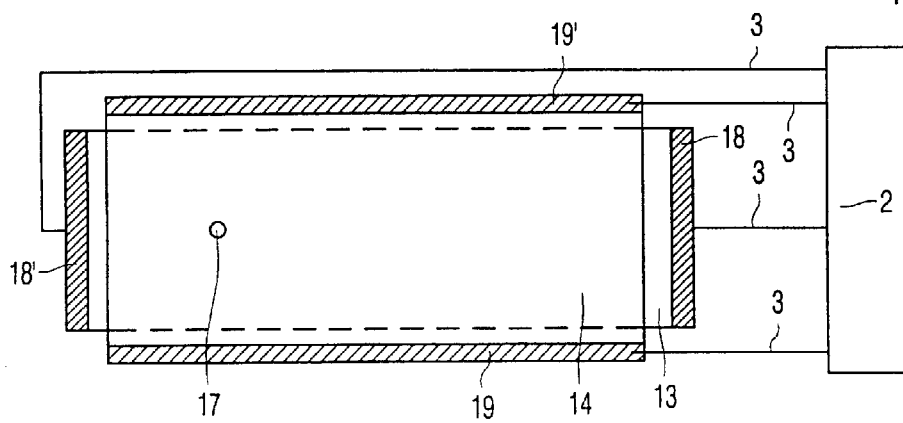
FIG. 2 is a plan view of the sensor device.

FIG. 1 shows a known device 1 (touch panel display) with a sensor device 10, in this example a pressure-sensitive device having a first transparent substrate 11 and a second transparent substrate 12. Transparent conducting layers, for example ITO layers 13, 14 which are contacted via metallization strips 18, 19 (FIG. 2), are provided on the substrates 11, 12. In this example, the assembly is provided with a protective coating 16, while the substrates are spaced apart by means of spacers 15. If the surface of the sensor device 10 is touched with a pen, for example, at the position 17, while the connection metallizations 19, 19' are, for example, connected to earth via connection lines 3, the resistance between the connection metallizations 18, 18' changes. This change of resistance, which is measured also via connection lines 3, is an indication of, for example the X co-ordinate of position 17 which is stored in detection device 2. Similarly, the Y co-ordinate is-determined and stored. If necessary, these X and Y co-ordinates are processed and determine drive signals which are applied to the display device 20 via connection lines 4. In this embodiment, the display device 20 is a reflective liquid crystal display device (LCD) comprising twisted nematic liquid crystal material 23 which is present between two substrates 21, 22 of, for example glass, provided with reflecting electrodes 25 of, for example aluminum, and light-transmissive ITO electrodes 26. The assembly is sealed by means of a sealing edge 24. If necessary, the display device further comprises orientation layers (not shown) which orient the liquid crystal material on the inner walls of the substrates, and a polarizer 28, while in this embodiment, also a retardation film 29 is provided between the substrate and the polarizer. To realize a small angle dependence, the display device is provided with a light-scattering layer 27 on the side facing the sensor device 10.

Information about the position 17 (the position where the sensor device is activated) is processed in the detection device (which also functions as a processing unit) to an image to be displayed (a luminescing pixel, a functional icon or a computer menu). Instead of the mechanism described above, the detection device may also be based on a matrix of light-sensitive elements which are activated by means of a light pen as used in, for example the device described in said U.S. Pat. No. 5,194,862.

As stated in the opening paragraph, it is very difficult from a manufacturing-technical point of view to provide the total stack of the light-scattering layer 27, the polarizer 28 and the retardation film 29 on the surface of the substrate 21, notably the manufacture of this stack on large surfaces with constant thicknesses of the sub-layers. Moreover, the fixation of the complete stack (27, 28, 29) involves many problems due to the small flexibility of this stack on the substrate.

What is claimed is:

1. A device comprising a sensor device with a detection device for determining information of at least a part of a surface of the sensor device, a display device comprising an electro-optical medium between two substantially parallel substrates, and a driver for driving the display device in dependence upon the information obtained via the detection device, wherein the sensor device comprises a substrate having a side facing the electro-optical medium, and a light scattering film and a polarizer on said side.

2. A device as claimed in claim 1 characterized in that the substrate of the sensor device having a side facing the electro-optical medium and a light scattering film and a polarizer on said side is further provided with an anti-reflex coating on the one of a light scattering film and a polarizer.

3. A device as claimed in claim 1, characterized in that at least one of the two substantially parallel substrates of the display device remote from the sensor device is provided with a reflector.

4. A device as claimed in claim 3, characterized in that at least one picture electrode on the substrate of the display device remote from the sensor device is reflective.

5. A device as claimed in claim 3, characterized in that the reflector is arranged on the side, facing the electro-optical medium, of the substrate of the display device remote from the sensor device.

* * * * *